United States Patent
Chevallier et al.

(10) Patent No.: US 7,565,679 B2
(45) Date of Patent: Jul. 21, 2009

(54) METHOD FOR PROCESSING VIDEO DATA DESIGNED FOR DISPLAY ON A SCREEN AND DEVICE THEREFOR

(75) Inventors: Louis Chevallier, La Mézière (FR); Gilles Even, Saint Brieuc (FR); Francois Le Clerc, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1253 days.

(21) Appl. No.: 10/415,214

(22) PCT Filed: Oct. 30, 2001

(86) PCT No.: PCT/FR01/03377

§ 371 (c)(1),
(2), (4) Date: Apr. 24, 2003

(87) PCT Pub. No.: WO02/37836

PCT Pub. Date: May 10, 2002

(65) Prior Publication Data

US 2004/0047596 A1    Mar. 11, 2004

(30) Foreign Application Priority Data

Oct. 31, 2000 (FR) .................. 00 14009

(51) Int. Cl.
*H04N 7/173* (2006.01)

(52) U.S. Cl. .................................................. 725/134
(58) Field of Classification Search .................. None
See application file for complete search history.

(56) References Cited

U.S. PATENT DOCUMENTS

| | | | |
|---|---|---|---|
| 5,949,476 A | 9/1999 | Pocock et al. | 348/24 |
| 7,079,176 B1 * | 7/2006 | Freeman et al. | 348/207.1 |
| 7,293,280 B1 * | 11/2007 | Gupta et al. | 725/139 |

FOREIGN PATENT DOCUMENTS

| | | |
|---|---|---|
| DE | 19737889 | 3/1998 |
| DE | 19737889 A1 | 3/1998 |
| EP | 1026887 | 8/2000 |

* cited by examiner

*Primary Examiner*—John W Miller
*Assistant Examiner*—Chenea P Smith
(74) *Attorney, Agent, or Firm*—Robert D. Shedd; Joseph J. Opalach; Bruan J. Cromarty (57) ABSTRACT

The invention concerns a method for processing audio-visual broadcasts to display a summary thereof. The method comprises a prior step which consists in recording an audio-visual broadcast, and a step which consists in searching within the recorded broadcasts slow-motion sequences and a step which consists in displaying the sequences found. User controls enable to browse among the found sequences. The invention also a receiver set for audio-visual broadcasts provided with a storage unit for storing the slow-motion sequences of an audio-visual broadcast. The apparatus also includes controls enabling the user to display the stored sequences.

14 Claims, 8 Drawing Sheets

METHOD FOR PROCESSING VIDEO DATA DESIGNED FOR DISPLAY ON A SCREEN AND DEVICE THEREFOR

This application claims the benefit, under 35 U.S.C. Å 365 of International Application PCT/FR01/03377, filed Oct. 30, 2001, which was published in accordance with PCT Article 21(2) on May 10, 2002 in French and which claims the benefit of French patent application No. 0014009, filed Oct. 31, 2000.

The invention relates to a method of processing video data intended to be displayed on screen as well as to a device implementing the method. The invention applies more particularly to the detection of video data extracted from a television program possessing a certain characteristic, and to their display on a television screen.

The context of the present invention is that of domestic audiovisual servers, and generally of any appliances capable of displaying audiovisual programs received from a broadcasting network. Nowadays, a user of such an appliance can obtain a large amount of audiovisual information. He therefore has little time to devote to each program and often prefers to leaf through them by displaying a summary. Programs such as football matches comprise moments which are more interesting than others, the goals for example or the best action. A user having little time may wish to see only a summary composed of the most interesting sequences. Broadcasters of television programs may transmit audiovisual summaries corresponding to certain programs which they broadcast. These summaries are for example the trailers of broadcast films. However, this obliges the broadcaster to construct said summaries. Moreover, the broadcasting of such summaries occupies an appreciable bandwidth on the broadcasting network.

One of the aims of the present invention is to be able to provide the user with summaries of audiovisual programs. The present solution does not necessitate additional processing on the part of the broadcaster and does not demand any additional bandwidth.

For this purpose, the invention relates to a method of displaying parts of audiovisual programs in an audiovisual receiver, said programs being broadcast on a broadcasting network and displayed with the aid of a display means at the level of the receiver, comprising a prior step of recording at least one program in a memory of the receiver, and characterized in that it furthermore comprises the following consecutive steps:
  a step of reading the programs from the memory,
  a step of searching for at least one slow motion sequence within the programs,
  a step of displaying at least said slow motion sequence.

The receiver reads from its memory the program that the user wishes to display, detects the slow motion sequences and sends them in succession to a display screen. The user sees in order only the sequences which seem to be particularly interesting since the broadcaster offers them in slow motion. The broadcaster does not then need to construct audiovisual summaries and to transmit them since it is the receiver which deals with this, thereby saving bandwidth. If the user has time later, he can see the program which is recorded in its entirety in the memory of the receiver.

According to a particular mode of operation, user commands make it possible to control the displaying of the succession of slow motion sequences, such as: displaying of the sequences continuously or shot-by-shot, skipping to the next sequence, skipping to the previous sequence, display at normal speed.

According to a particular mode of operation, the step of detecting slow motion sequences within programs composed of frames comprises:
a) a step of motion detection operating on two consecutive frames extracted from the audiovisual programs, said step generating a string of values of motion or of absence of motion of binary indicators respectively indicating the presence or the absence of motion between the two relevant frames,
b) steps of determining a frame repetition pattern composed of a motion value and of a consecutive string of at least one absence of motion value, said repetition pattern having a length,
c) at least one step of constructing a reference pattern from a first frame repetition pattern,
d) steps of detecting patterns composed of a string of values of motion and of absence of motion of a length equal to that of the reference pattern,
e) steps of comparing between the reference pattern and patterns previously determined in step d),
f) a step of reckoning up in a so-called confidence counter the number of identities between the reference pattern and the patterns determined during steps d),
g) a step of validating the presence of a slow motion sequence when the value of the confidence counter is greater than a determined value (Thigh).

According to a particular mode of operation, the method comprises a step of calculating a slow motion factor.

According to a particular mode of operation, the method comprises a step of validating a lock-on signal when the value of the confidence counter is greater than a determined value (Tlow).

According to a particular mode of operation, the reckoning step effects a reduction in the value of the confidence counter when step d) detects an inequality. According to another mode of operation, a ceiling is placed on the value of the confidence counter.

The subject of the invention is also a receiver of audiovisual programs comprising a means of receiving programs transmitted on a broadcasting network, a means of storing a part at least of audiovisual programs received, a means of reading the memory and a means of displaying the programs read, a detector of slow motion sequence within a recorded audiovisual program, characterized in that it comprises a display module controlling the means of reading the memory and the display means so as to display the slow motion sequences detected by the slow motion detector analyzing the program read by the reading means.

The receiver can record audiovisual programs from a network. Then, the user transmits a command to his receiver so that it reads the program recorded and detects the slow motion sequences, each sequence detected is displayed on a screen. In this way, the user can quickly see the most interesting moments of the program. According to a particular mode of operation, the receiver displays the slow motion sequences at normal speed, thereby making it possible to further accelerate the displaying of the summary.

According to another particular mode of operation, the display module comprises user controls and means making it possible
  to read the slow motion sequence recorded after the sequence in progress and to display it without waiting for the end of the sequence in progress,
  to read the slow motion sequence recorded immediately before the sequence in progress and to display it without waiting for the end of the sequence in progress, to display at normal speed the slow motion sequences read from the memory.

According to a particular mode of operation, the receiver comprises a memory for storing at least a part of an audiovisual program, a motion detector detecting a motion (M) or an absence of motion (S) between two images of like parity of said audiovisual program which are read from said memory, characterized in that it furthermore comprises a means for determining a frame repetition pattern composed of a value (M) followed by a sequence of values (S) comprising at least one value (S), a memory for storing a so-called reference pattern obtained by the means for determining a frame repetition pattern, a comparator comparing the reference pattern with the patterns recorded at the output of the motion detector operating on the frames emanating from the processed audiovisual program, a so-called confidence counter reckoning up the number of identities which is determined by the comparator, a means for transmitting a signal of presence of slow motion when the value of the confidence counter reaches a determined value (Thigh).

According to a particular mode of operation, the receiver calculates the slow motion factor, the latter being equal to the number of values of motion and of absence of motion of the reference pattern.

According to a particular mode of operation, the receiver generates a lock-on signal when the value of the confidence counter reaches a determined value. This lock-on signal triggers the storage of the audiovisual program in the appliance.

According to a particular mode of operation, the receiver divides the value of the confidence counter when the comparator detects a difference between the reference pattern and the frame repetition pattern detected by the determining means.

According to a particular mode of operation, the motion detector incorporated into the receiver detects a motion between two frames of like parity which are separated by at least one frame of the same parity as the first two.

Other characteristics and advantages of the present invention will emerge from the description of the exemplary embodiments which follow, taken by way of nonlimiting examples, with reference to the appended figures in which.

Figure 1:
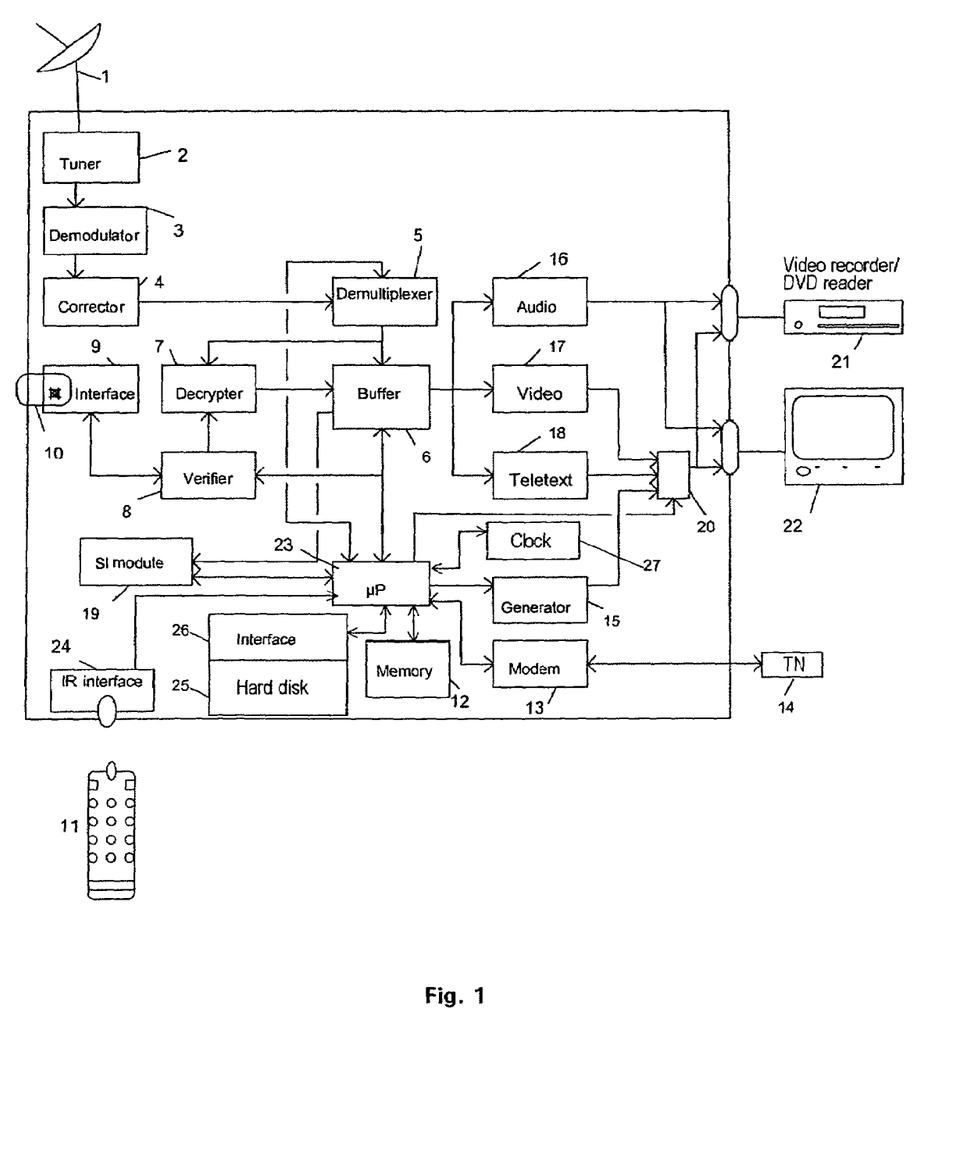
FIG. 1 represents a television receiver for the implementation of the invention.

An audiovisual receiver according to the present exemplary embodiment is described in FIG. 1. The receiver is, for example, a television decoder in accordance with the DVB specifications. It uses an ISO/IEC 13818-1 transport layer.

The receiver is linked to an antenna 1, itself linked to a tuner and possibly to a reader 21, typically a video recorder, of a median for audiovisual programs. The signal provided by the tuner is demodulated by a demodulator 3. The demodulated data are deinterlaced and corrected by an error correcting circuit 4 and sent to a demultiplexer 5. The latter comprises a certain number of filters programmed by a microprocessor 23 as a function of the various applications supported by the receiver. The microprocessor 23 is connected to a memory 12 comprising the operating system as well as the resident or downloaded programs for implementing applications such as an EPG. The memory is illustrated in the form of a single block, but physically may comprise several blocks of different kinds; random access memory RAM, read only memory ROM, reprogrammable memory EEPROM or FLASH. The read only memory ROM contains among other things the basic program of the decoder. This program comprises input/output management routines such as: programming of the demultiplexer, receiving of orders transmitted by the remote control, displaying of video sequences recorded in memory and specified by a pointer, etc.

A character generator 15 allows the generation of control or graphics menus relating to the parameters of the receiver or to a particular application. The video signal generated is multiplexed with one of the video signals originating from the video receiver 17 to a SCART socket linked to a television 22. The multiplexing circuit 20 is managed by the microprocessor 23. The receiver is also equipped with a remote control 1, linked to the microprocessor by an infrared link 24. This remote control has inter alia navigation buttons (←, →, ↑↓) and: <<◄>>, <<►>>, <<OK >>, <<END >> buttons.

For the clarity of the diagram, only the most important connections of the microprocessor 23 are illustrated.

The audio or video sections or packets filtered by the demultiplexer are stored in predefined areas of a buffer memory 6. The receiver also comprises a hard disk 25 linked to the microprocessor with the aid of an interface 26 allowing fast transfers of information. The hard disk is advantageously integrated with the decoder, it can be proposed in the form of a separate piece of equipment. The support of the disk may possibly be removable. The program executable by the microprocessor 23 analyses the data stored in the buffer memory 6 by the demultiplexer 5 and determines whether they correspond to the profile selected by the user. If so, they are then recorded in the hard disk 25. The capacity of the disk makes it possible to record at least several hours of audiovisual programs in a compressed format (MPEG 2 for example).

Figure 2:
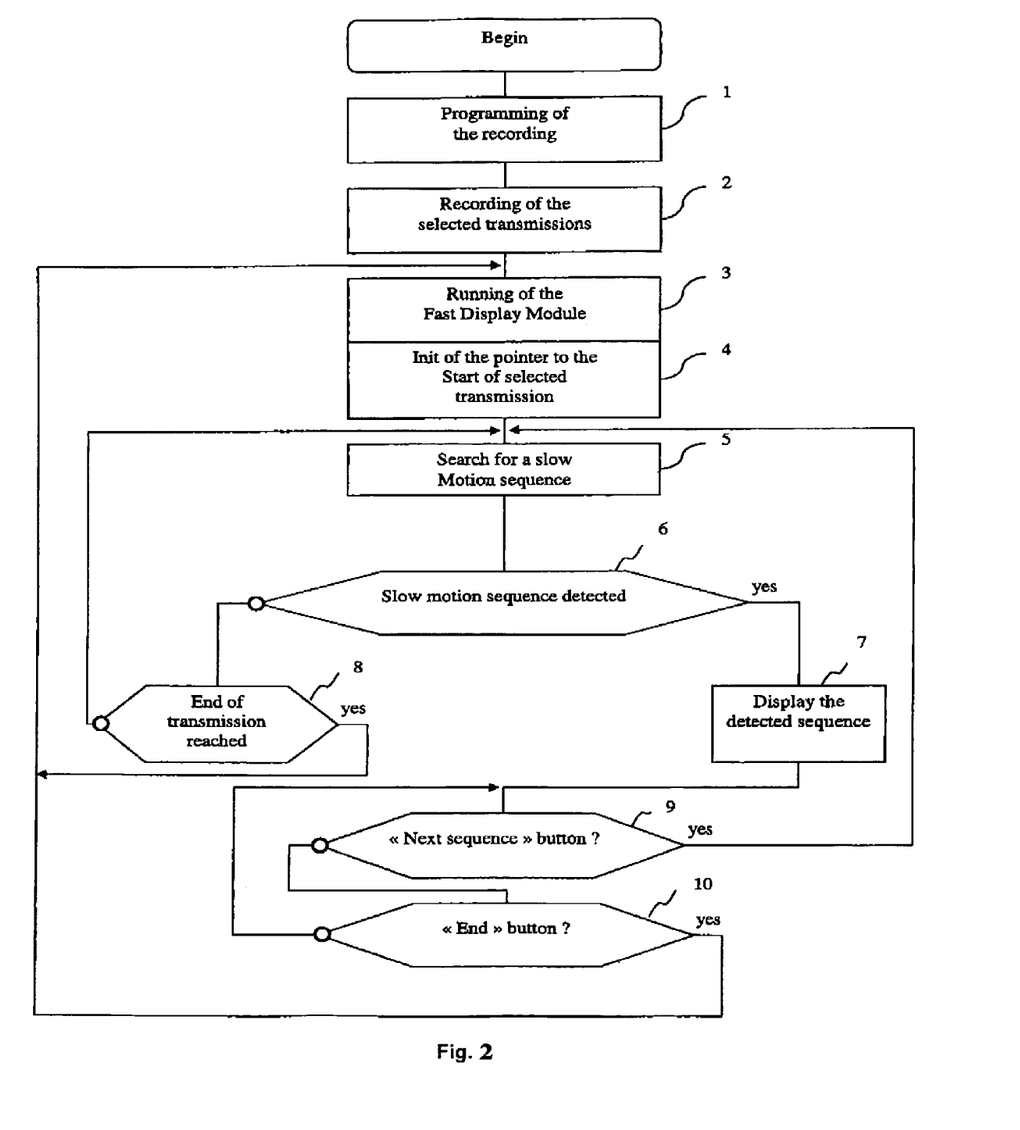
FIG. 2 represents a flowchart of the various steps of the method according to the invention.

FIG. 2 represents a flowchart of the operations for the implementations of the present invention. Firstly (step 1), the user programs his reception appliance so as to record one or more programs. The programming can be performed either by defining a timeslot and a determined service, or by explicitly specifying the event (with the aid of an Electronic Program Guide for example, EPG for short). In step 2, the programs are actually recorded in the hard disk.

Secondly (step 3), the user wishes to quickly display the content of the memory of his hard disk. He then runs a Fast Display Module, FDM for short. According to a preferred embodiment, this module is physically speaking a program managed by the microprocessor, although conceptually it is an application which processes data packets, in the fashion of an audio or video receiver, for which packets dedicated circuits are used. Simply, with the help of a menu displayed on the screen, the module presents information relating to all the programs recorded in the hard disk. This menu is said to be "initial". This information is for example the title, the duration, the service from which the program has been extracted .

. . or any other information capable of helping the user in his choice. The user navigates around this menu, visually highlighting the programs. By pressing the "OK" button of the remote control 11, he instigates the fast display of the event highlighted. The triggering of fast display can also be performed with the help of an icon displayed on the screen. Pressing the "END" button of the remote control 11 (or a corresponding icon) makes it possible to exit the FDM module.

Here now is the way in which the fast displaying of an event operates. The audiovisual data read from the hard disk are extracted using a pointer. When the user selects a program, in step 4, the FDM module initializes this pointer to the start address of the selected program. Then (step 5), the module searches from the position defined by the pointer and up to the end of the program recorded, for the slow motion sequences. We shall see subsequently the way in which such sequences are detected. In step 6, a slow motion sequence is detected thereby causing the execution of step 7 in the course of which the sequence is displayed. If the end of the program is reached without a sequence having been detected (test of step 8), the module displays the initial menu (step 3), the user can thus quickly display other programs recorded or exit the FDM. The display in step 7 can be parameterized, the various options will be seen subsequently. At the end of step 7, the program skips to step 8 and waits for a command from the user. In this embodiment, the user manually controls the succession of the displaying of the various sequences. When the user presses the [▶] button of the remote control 11, the module skips to step 5 so as to search for the next slow motion sequence. If the user presses the <<END>> button (step 10), he interrupts the quick display and returns to the initial menu.

Figure 3:
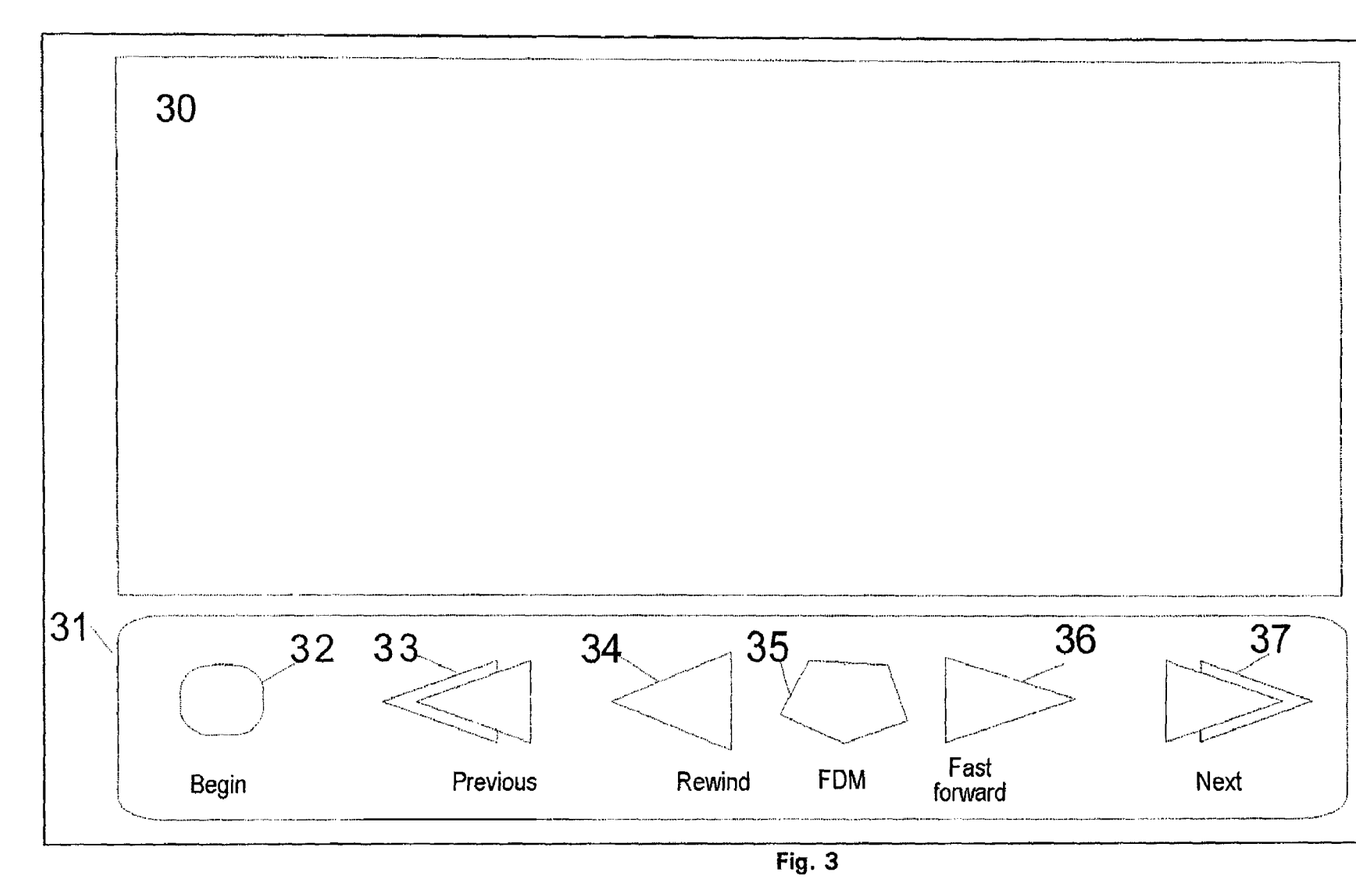
FIG. 3 shows a screen view for the control of the fast display module.

FIG. 3 shows an exemplary menu appearing when the user displays programs recorded in the memory of the receiver. The selected program appears at the top of the screen 30 and a command strip 31 at the bottom of the screen. This strip contains the command icons. As a variant, the strip does not appear and the commands are effected by function buttons on the remote control 11. A nonlimiting list of commands is: go to the start of the displaying of the recorded programs 32, displaying of the previous recorded program 33, displaying of the program 34 in reverse, running of the FDM 35, fast display of the recorded program 36, display of the next recorded program 37. The command which is of most interest to us in respect of the present invention is that making it possible to run the fast display module (FDM).

It goes without saying that the commands already described and those which will be subsequently may be effected either with the help of specific function buttons on the remote control 11 or through icons displayed on the screen 22 and activatable with the help of direction buttons and an "OK" button. Subsequently, the commands will be described by icons, but the use of function buttons on the remote control should not be excluded.

A first improvement of the present exemplary embodiment consists in the slow motion sequences being displayed sequentially and continuously. To do this, a user command entitled "continuous/shot-by-shot display" makes it possible either to display the next sequence when the user actuates the <<▶>> command, or to display the succession of sequences without interruption. In this latter case, the program after step 7 skips directly to step 10 and does not perform the test of step 9. The "continuous/shot-by-shot display" command is a command with two states, a new actuation toggles into the initial state.

Another improvement consists in, during the display of the slow motion sequence, the activation of the <<▶>> icon interrupting the display of the sequence in progress in step 7, and the sending of the program to step 5 for searching for the next slow motion sequence. This sequence is displayed directly.

Another improvement consists in the user being able at any moment to return to the start of the slow motion sequence in progress by activating the <<◀>> icon. This improvement is effected by storing in a temporary memory the value of the start of sequence pointer. By activating the [◀] icon twice in quick succession (also called "double click") it is possible to return to the slow motion sequence preceding the one in progress. This function is easily achievable by placing in a stack the start addresses of each slow motion sequence detected. Another modus operandi which will be detailed subsequently, consists in detecting the sequences during reception, in storing only the sequences and in creating an index table of the sequences.

A third improvement consists in displaying the slow motion sequences at normal speed. This is performed by knowing the slow motion ratio, the determination of this ratio being performed at the same time as the detection of the slow motion sequences. The user requests the displaying of the slow motion sequences at normal speed by activating the icon entitled "normal/slow speed". The screen management module multiplies the speed of display of the sequence read from the memory by the slow motion ratio. In this way, the displaying of the summary constructed from all the slow motion sequences is accelerated and lasts a minimum time. A second activation of the icon causes a return to the initial slow motion speed.

Figure 4:
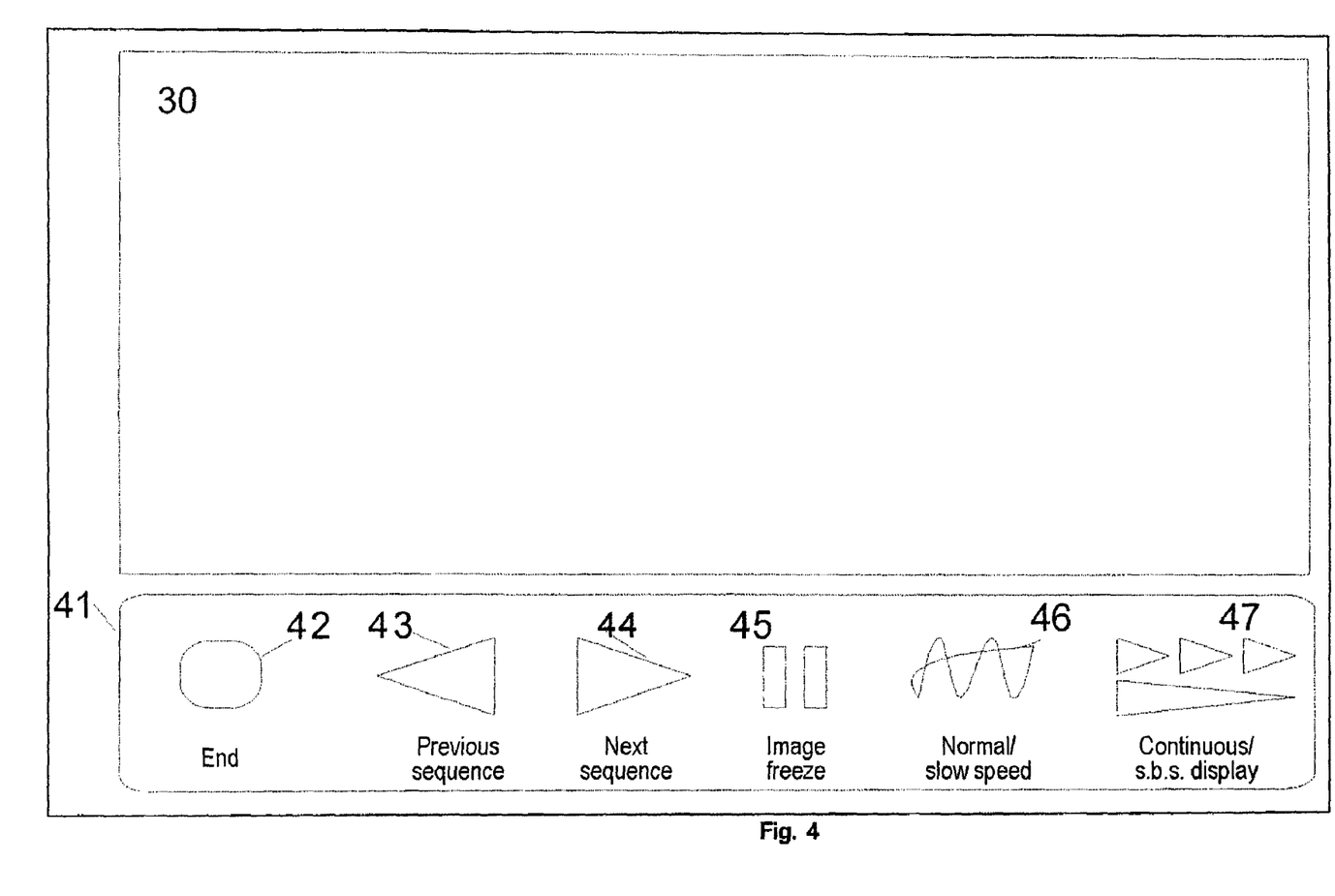
FIG. 4 shows a screen view during the displaying of a slow motion sequence.

FIG. 4 shows an exemplary screen during the fast display of a recorded program. The slow motion sequences appear at the top of the screen 30 and a command strip 41 at the bottom of the screen. This strip contains the following command icons, offered to the user:

End of FDM, return to normal display of the program (42).
Return to the start or to the previous sequence (43).
Skip to the next sequence (44).
Image freeze (45).
Normal/slow speed display (46).
Continuous/shot-by-shot display (47).

The detection of slow motion can be undertaken in various ways. The program broadcaster can identify the slow motion sequences with the help of an identifier transmitted in the service information. This identifier comprises the name of the event, the time references for the start and end of the slow motion sequence and the slow motion ratio value. It is recalled that this value is taken into account when the user wishes to display a slow motion sequence at normal speed. This first modus operandi forces the broadcaster to know the slow motion sequences in advance.

A variant consists in analyzing the recorded images of the program and in detecting whether these images are members of a slow motion sequence. We shall now describe such a method of detection. This method has the advantage of avoiding any modification of the data broadcast, and in particular the use of an identifier of slow motion sequences.

Figure 5:
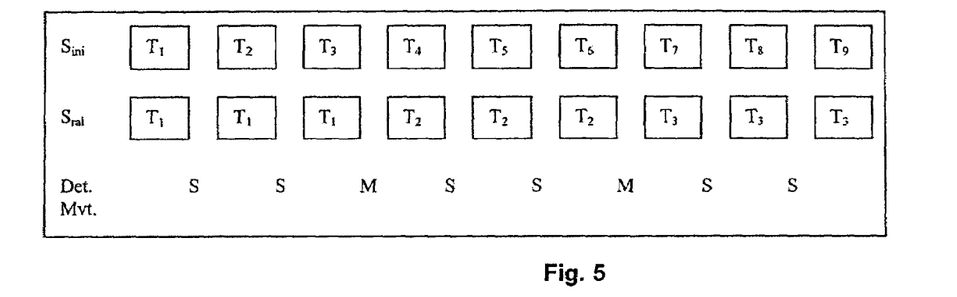
FIG. 5 shows an exemplary pattern of motion of the frames making up a slow motion sequence.

For a better understanding of the way in which the detector operates, the way in which a slow motion sequence by repetition of frames is produced will be described. FIG. 5 shows an initial sequence dubbed "Sini". From this sequence, a slow motion sequence dubbed "Sslo" is produced. By tripling the number of frames broadcast, this broadcast taking three times as long, the sequence is displayed three times as slowly as the starting sequence "Sini". The slow motion factor in this example is equal to 3.

The present exemplary embodiment uses a motion detector which analyzes two consecutive frames extracted from an audiovisual program and which determines whether they differ significantly or not. A frames repetition detector uses the output values from this detector to determine whether the images are completely static or whether they are in motion over time. Specifically, the slow motion detector must be able to distinguish sequences containing still images such as the showing of a painting, sequences at normal speed, and slow motion sequences where the images alter slowly so as to detect only the latter. Only the sequences corresponding to the third category have to be detected.

Figure 6:
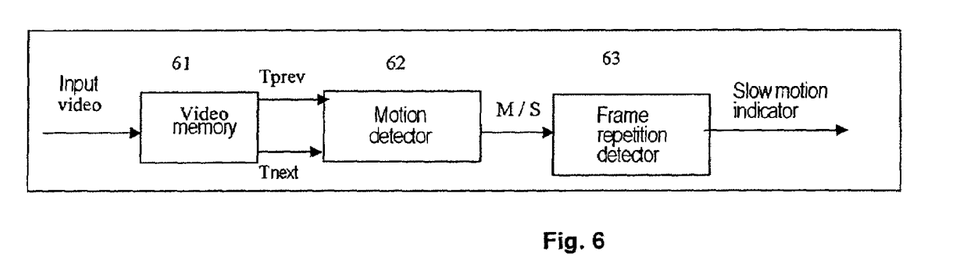
FIG. 6 shows the general principle of operation of a device for detecting slow motion sequences.

FIG. 6 shows the general principle of operation of the device for detecting slow motion sequences forming the subject of the invention.

The device receives as input the video signals broadcast and stores them in a video memory 61 which forms part of the memory 12. The video data are read from the memory 61 and transmitted to a motion detector 62 by two outputs corresponding to the signals of two consecutive frames Tprev and Tnext. The motion detector 62 operates by calculating via thresholds the inter-frame differences, that is to say the accumulation, over all or some of the frames, of the difference in luminance between the pixels situated at the same position in the two frames. For each pair of frames input, it provides a so-called "motion" indicator of Boolean type. The value of the motion indicator is M ("M": motion) if the detector detects a motion between the two analyzed frames or S ("S": static) if the two frames are perfectly or significantly identical. The succession of the values M and S of the indicator in the course of time is analyzed by the frames repetition detector 63, which sets a Boolean at its output indicating whether the input video sequence does or does not correspond to a slow motion.

The detection of the motion patterns corresponding to slow motions is performed in two steps:

$1^{st}$ step: one attempts to detect, in the succession of values M and S output from the motion detector, a frame repetition pattern.

$2^{nd}$ step: the output of the motion detector is correlated, for several slow motion periods, with the frame repetition pattern detected in the first step, and the detection of slow motion is validated or otherwise as a function of the number of observed identities between the pattern emanating from the motion detector and the expected pattern.

Let us return to FIG. 5, the latter shows an exemplary string of indicator values output by the motion detector, which corresponds to a slow motion with factor 3 generated by repetition of frames. By analyzing the succession of values, it is noted that it exhibits a characteristic pattern, the so-called "reference pattern". In the example, this appears periodically every three frames, it comprises a transition with motion (denoted "M" in FIG. 5) followed by two motionless or static transitions (denoted "S" in FIG. 5). The reference pattern is in this instance: [M-S-S]. The reference pattern obtained with the help of the output values from the motion detector consists of an indicator "M" immediately followed by a sequence of consecutive indicators "S". The number of symbols M and S of the reference pattern is equal to the slow motion ratio denoted N. In the example, the reference pattern is M-S-S, these three values manifesting the fact that the same frame is repeated three times, the slow motion ratio N is therefore equal to 3 (=1+2).

The reference pattern represented in FIG. 5 consists of a value "M" and of two values "S" (N=3). It is easy to generalize this pattern to integer slow motion ratios N equal to 2 or more, the reference pattern then consisting of an indicator "M" followed by (N−1) indicators "S". If a slow motion is present, the reference pattern is reproduced identically at the output of the motion detector. The determination of the slow motion ratio N is an important item of data which is related to each slow motion sequence and which may serve during display. For example, the user may wish to display the slow motion sequences broadcast at normal speed by sending only one image out of N to the screen, the effect of this being to accelerate the slow motion sequence in the same ratio.

Figure 7:
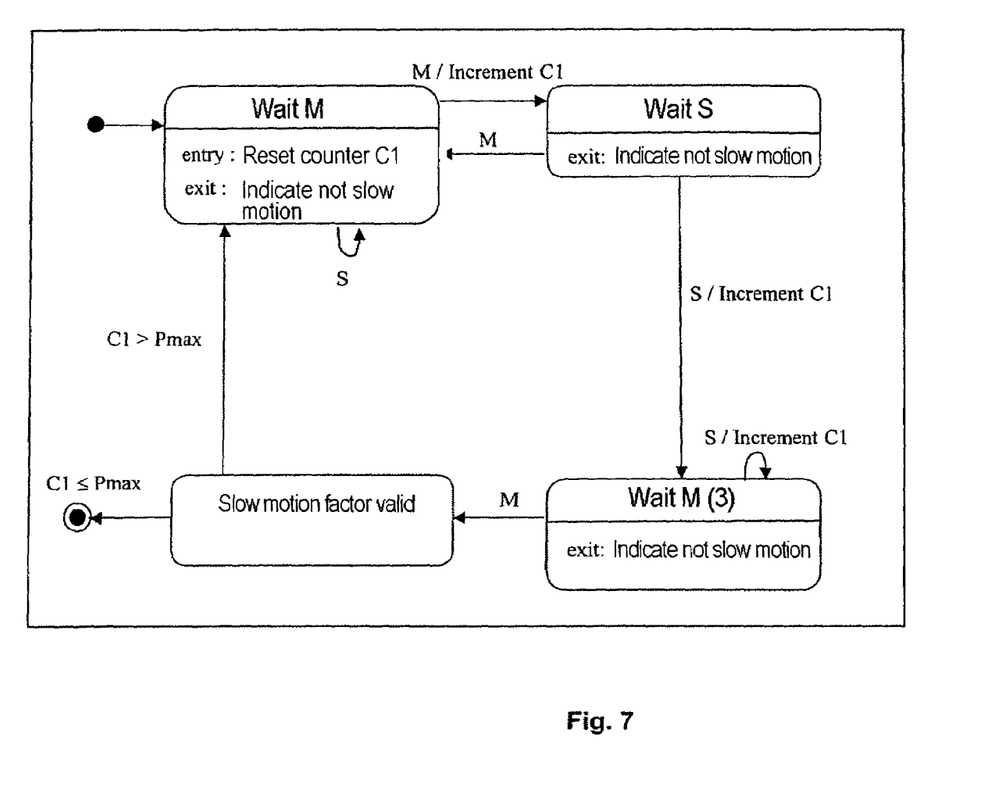
FIG. 7 is a diagram of a finite state automaton making it possible to detect a motion pattern corresponding to a slow motion period, FIG. 8 a diagram of a finite state automaton making it possible to perform the processing applied so as to validate the slow motion sequence detection, when a motion pattern corresponding to a slow motion period has already been detected.

FIG. 7 is a diagram of a finite state automaton making it possible to process the patterns of the indicator values. This drawing is in accordance with the UML standard for state machines. The principle of repetitive-pattern detection is as follows: it concerns the marking, at the output of the motion detector, of the sequences consisting of an indicator "M" followed by at least one "S". During the reception of an "M", a counter C1 which will determine the period of the pattern detected, which corresponds to the slow motion ratio if the detection is validated, is initialized to 1. After reception of the "M", we wait for an "S". If the indicator received does not correspond to the expected value, the automaton returns to its initial state. In the converse case, the counter C1 is incremented. After reception of the first "S" following an "M", we loop back to the reception of "S", incrementing the counter C1 at each new indicator "S". The reception of an "M" represents the end of a repetition period, and triggers the end of the first step of detection of the repetition pattern. The pattern detected is however validated only when its length, given by the value of the counter C1, is less than a predetermined maximum period Pmax, corresponding to the maximum allowable slow motion ratio.

Throughout this detection phase, the motion pattern not being validated as corresponding to a slow motion, it is appropriate to indicate at each frame period that no slow motion sequence has been detected.

Figure 8:
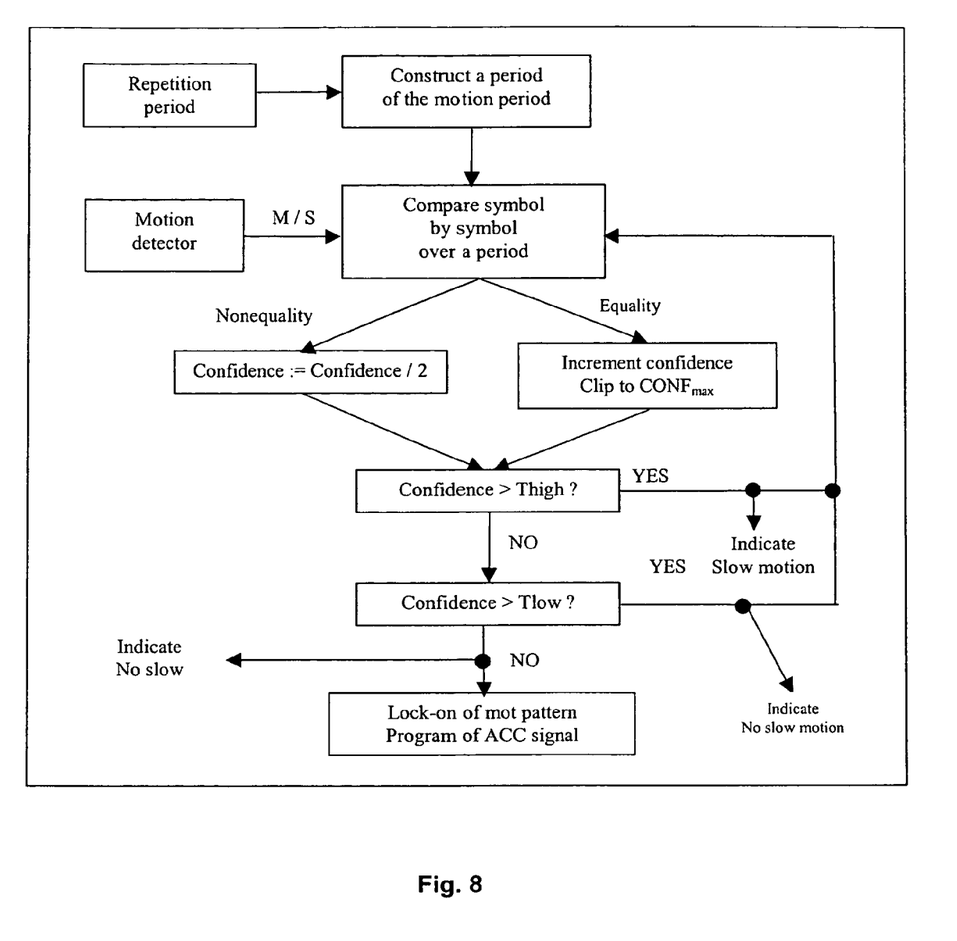

FIG. 8 illustrates the processing applied to validate the detection of slow motion sequence on the data emanating from the motion detector, from the slow motion ratio estimated in the determining phase.

The validation of the detection of a slow motion sequence consists in comparing blocks of N consecutive values commencing with an "M", with a reference pattern determined during the detection step, and in verifying their identity. The reference pattern is constructed as a function of the repetition period calculated during the first step, and consists of a value "M" followed by as many "S" values as necessary to complete the period. Depending on whether or not there is identity, over a period of repetition of the pattern, between the string of values "M" and "S" at the output of the motion detector and the reference pattern, the value of a confidence counter, initialized to 0, will be modified as follows:

If there is identity with the reference pattern, one unit is added to the counter. The addition is performed up to a predetermined value CONFmax. In the present exemplary embodiment, the value of CONFmax is equal to: 32.

If at least one symbol differs, an integer division by two of the confidence counter is performed.

If no identity is detected, the value of the confidence counter remains at "0". If there is identity, the counter increases slowly up to a ceiling value. The confidence counter may be represented by a byte. On the other hand if there is no longer any identity, the counter decreases rapidly.

It should be noted that the reference pattern corresponds in actual fact to a particular phase, among all the possible phases in a repetition period, of the reference motion pattern. Consequently, the process of validation with the output of the motion detector should be synchronized in such a way that the group of samples which emanates from the motion detector comprises an "M" indicator first, and then the "S" indicators. This synchronization is performed naturally, insofar as the output state of the detection process corresponds precisely to this phase. It is therefore sufficient to perform the reading of the first group of motion indicator values with a view to validation in tandem with detection so that the phasing is correct.

The value of the confidence counter is thereafter compared at each pattern reception with two thresholds of predetermined values, a high threshold Thigh (less than CONFmax) and a low threshold Tlow:

If the confidence is greater than Thigh, the slow motion detection is presumed to be validated and the system output indicator is set accordingly; one remains in the validation phase and one therefore reads a new group of symbols, corresponding to the estimated period of repetition composed of N values of indicators at the output of the motion detector, which are compared with the reference pattern;

conversely, if the confidence is less than the low threshold Tlow, the presence of an erroneous detection of slow motion is presumed, the presence of a slow motion sequence is not validated.

If the confidence lies between the two thresholds Thigh and Tlow, the absence of slow motion is indicated, but the validation is continued by processing a new group of symbols originating from the motion detector.

The ceiling value CONFmax of the confidence counter being 32, the values Thigh and Tlow are for example 16 and 8 respectively. The signal delivered called "ACC" (standing for "lock-on") when the confidence lies between the two thresholds Thigh and Tlow, indicates that at least two slow motion patterns have been detected but this is not sufficient to be sure that a slow motion is present. When the value of the confidence counter reaches Thigh, it is certain that a large number of consecutive coincidences between the observed pattern and the reference pattern have occurred, the slow motion detection can then be validated.

When a slow motion sequence appears, the confidence counter is incremented during each identity observed between the pattern emanating from the motion detector and the reference pattern. Hence, 32 identities are necessary in order for the counter to reach its ceiling. Let us now assume that the slow motion sequence ceases. Upon the first difference with the reference pattern, the value of the counter becomes equal to 16. The slow motion detection signal is therefore still activated. Upon the second consecutive difference, the counter has the value 8, the slow motion detection signal is deactivated, but the lock-on signal remains active. It is only at the third difference (the value of the counter is equal to 4) that both signals are deactivated.

An improvement to the present invention consists in using the ACC signal to trigger the storage of the frames of the audiovisual program received in a temporary memory (a part of the hard disk 25 for example). If ultimately, no slow motion sequence is detected, the confidence counter falling back below the value Tlow, then these data will be overwritten. Otherwise, they are stored in memory at the addresses preceding those of the slow motion sequence actually detected. In this way, almost the entire slow motion sequence forms a continuous block and can be displayed without interruption.

Figure 9:
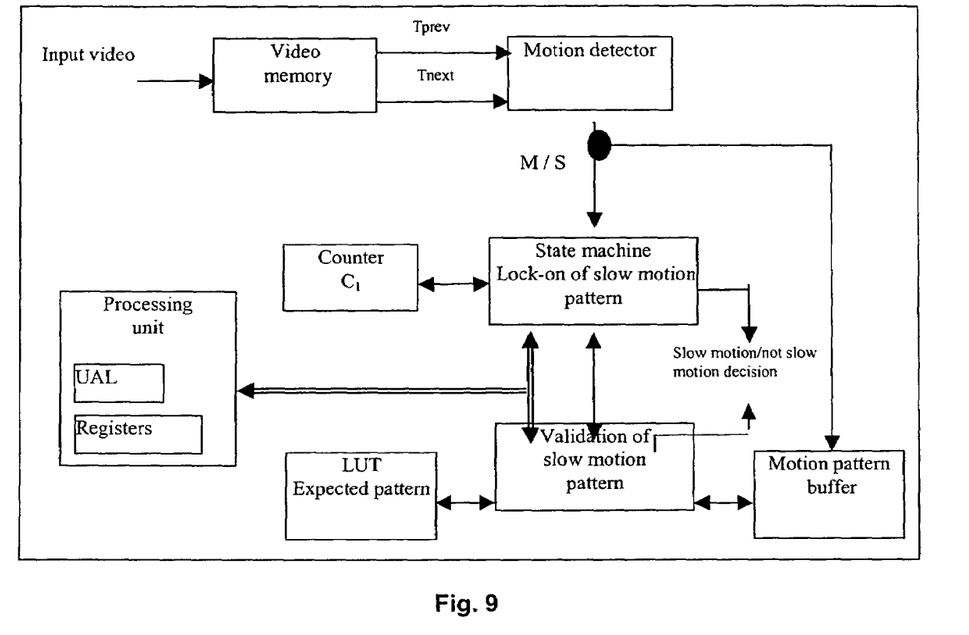
FIG. 9 represents a general diagram of the device for detecting slow motion sequences.

FIG. 9 represents a general diagram of the device for detecting slow motion sequences.

The input stream comprises among other things the luminance and chrominance information of the pixels constituting the frames of the video signal. This information is stored in a video memory possessing dual read access, so as to be able to provide the motion detector simultaneously with the luminance values of the pixels belonging to a first frame Tprev and to a second frame Tnext, and occupying the same locations inside these two frames. An exemplary embodiment of a motion detector consists of an electronic circuit making it possible to accumulate the luminance differences of the pixels emanating from Tprev and Tnext, and to compare the thresholds of the results of this accumulation so as to provide its output with a binary indicator "M/S", synchronous with the input video frames, signaling the presence (M) or the absence (S) of motion between the two processed frames. The values compared by the comparator are declared identical if they do not differ by a certain percentage. This percentage is 10% in the present exemplary embodiment. So much so that if the motion detector indicates if two frames are quasi-identical, the discrepancy between two pixels being 10% at most. This electronic circuit can be embodied as discrete electronic components or as a special-purpose integrated circuit (ASIC: "Application Specific Integrated Circuit") or as a software module using the computational and memory resources of a processing unit and built into the FDM.

The values output by the motion detector are provided to the processing block executing the state automaton which detects the presence of a slow motion sequence. This block has a port for read access and write access to the counter $C_1$, the function of which is to calculate the period of repetition of the motion pattern. The calculation is performed by reckoning up the number of indicators M (hence a unit) and of indicators S. After detection of a period of a slow motion pattern, the value of the counter $C_1$ is stored and the counter $C_1$ is set to zero. The repetition pattern thus detected constitutes the reference pattern; it is stored in a memory. The stored value of the counter constitutes the period of repetition of the reference pattern, and corresponds to the slow motion ratio.

Secondly, the output of the motion detector supplies a buffer memory allowing the storage of a string of values "M" and "S" constituting the output of the motion detector, of length equal to that of the reference pattern. The content of this buffer memory is compared later with the reference pattern. The capacity of this buffer must be computed as a function of the maximum value Pmax of the period of repetition of the motion pattern, which coincides with the maximum value of the slow motion ratio that one seeks to detect.

In the absence or at the start of the appearance of a slow motion sequence, the detection device 63 outputs a binary signal indicating, at each frame period, that no slow motion sequence has been detected, since the motion repetition pattern corresponding to a possible slow motion has not yet been validated. This block also controls the triggering of the slow motion pattern validation process. Finally, it provides the pattern validation block with the value of the repetition period of the pattern, and the signal ACC.

The value of the pattern repetition period allows the construction, by the validation block, of the reference pattern. This construction can advantageously be implemented by means of a "Look Up Table", addressed through the value of the detected repetition period, and comprising, for each value of this period presumed to be valid, the sequence of indicators "M/S" constituting the reference pattern.

The slow motion pattern validation block compares the string of values "M" and "S" stored in the buffer supplied by the output of the motion detector, and the reference pattern stored in the Look Up Table. This block validates the result of the comparison by means of the confidence counter introduced previously, so as to output a binary signal indicating, at each frame period, whether or not a slow motion sequence is present.

The slow motion pattern validation block finally comprises an output to the detection block, so as to be able to reinitialize and rerun the detection process should the validation of the slow motion pattern fail.

The slow motion pattern determination and validation blocks, as well as the counter $C_1$ and the buffer memories and LUT, may advantageously be implemented through a software module using the resources of a processor or processing unit comprising, inter alia, an Arithmetic and Logic Unit and registers allowing the storage of the intermediate variables of the processing. The processing constants such as Tlow, Thigh and CONFmax can be stored in a nonvolatile memory of ROM type (Read Only Memory).

The assembly of elements which is represented in the device of FIG. 9 is driven by synchronization signals relating to the sampling of the video pixels, of the lines of pixels and of the frames, available at the input of the device at the same time as the video stream.

If in the course of the program, the initial images alter very little without however constituting a slow motion sequence, the motion detector would be able to detect their identity. To avoid this, according to an improvement of the invention, the motion detector does not compare two frames which follow one another but two frames separated by at least one other frame.

It should be obvious to persons skilled in the art that the present invention allows embodiments under numerous other specific forms without departing from the as-claimed field of application of the invention. Consequently, the present embodiments should be considered by way of illustration but may be modified within the field defined by the scope of the appended claims.

In particular, the invention is not limited to television decoders but may be applied to any device for receiving audiovisual programs. The audiovisual programs may in particular be received in the form of a video cassette, the means of reception then having to be a means for reading an audiovisual medium.

The invention claimed is:

1. A method of displaying slow motion sequences included in audiovisual transmissions received from a broadcasting network, wherein the method comprises prior steps of detecting the slow motion sequences of said transmissions and recording at least the detected slow motion sequences in a memory of a receiver; and a step of displaying the slow motion sequences displayed consecutively, the displaying of each recorded sequence being accelerated, the step of detecting slow motion sequences within transmissions composed of frames comprising:

a) a step of motion detection operating on two consecutive frames extracted from the audiovisual transmissions, said step generating a string of values of motion or of absence of motion of binary indicators respectively indicating the presence or the absence of motion between the two relevant frames, b) steps of determining a frame repetition pattern composed of a motion value and of a consecutive string of at least one absence of motion value, said repetition pattern having a length, c) at least one step of constructing a reference pattern from a first frame repetition pattern, d) steps of detecting patterns composed of a string of values of motion and of absence of motion of a length equal to that of the reference pattern, e) steps of comparing between the reference pattern and patterns previously determined in step d), f) a step of reckoning up in a so-called confidence counter the number of identities between the reference pattern and the patterns determined during steps d), g) a step of validating the presence of a slow motion sequence when the value of the confidence counter is greater than a determined value.

2. The method of display as claimed in claim 1, wherein it comprises a step of detecting a user command triggering the display of the next slow motion sequence.

3. The method of display as claimed in claim 1, wherein it comprises a step of detecting a user command triggering the display of the previous slow motion sequence.

4. The method of display as claimed in claim 1, wherein it comprises a step of calculating the slow motion factor, with respect to the normal speed of the sequence detected, said factor being equal to the number of indicators of motion and of absence of motion constituting the reference pattern.

5. The method of display as claimed in claim 1, wherein it comprises a step of validating a lock-on signal when the value of the confidence counter is greater than a determined value.

6. The method of display as claimed in claim 1, wherein the reckoning step effects a reduction in the value of the confidence counter when step d) detects an inequality.

7. The method of display as claimed in claim 1, wherein in the course of the reckoning step, a ceiling is placed on the value of the confidence counter.

8. A receiver of audiovisual transmissions comprising a means of receiving transmissions transmitted on a broadcasting network, wherein it comprises a memory for storing at least a part of an audiovisual transmission, a means of detecting the slow motion sequence of said transmissions, a means of storing at least the detected slow motion sequences, a means for accelerating the slow motion sequences recorded, and a means of displaying the slow motion sequences thus accelerated, the means of detecting the slow motion sequence detecting a motion or an absence of motion between two images of like parity of said audiovisual transmission which are read from said memory, the means of detecting furthermore comprises a means for determining a frame repetition pattern composed of a value of motion followed by a string of values of absence of motion comprising at least one value of absence of motion, a memory for storing a so-called reference pattern obtained by the means for determining a frame repetition pattern, a comparator comparing the reference pattern with the patterns recorded at the output of the motion detector operating on the frames emanating from the processed audiovisual transmission, a so-called confidence counter reckoning up the number of identities which is determined by the comparator, a means for transmitting a signal of presence of slow motion when the value of the confidence counter reaches a determined value.

9. The receiver of audiovisual transmissions as claimed in claim 8, wherein it comprises a display module which controls the means for reading the memory and which, in response to a user command, read the slow motion sequence recorded after the sequence in progress and displays it without waiting for the end of the sequence in progress.

10. The receiver of audiovisual transmissions as claimed in claim 8, wherein it comprises a display module which controls the means for reading the memory and which, in response to a user command, reads the slow motion sequence recorded immediately before the sequence in progress and displays it without waiting for the end of the sequence in progress.

11. The receiver of audiovisual transmissions as claimed in claim 8, wherein it furthermore comprises a means of calculating a slow motion factor of the sequence with respect to the normal speed, the slow motion factor calculated is equal to the number of indicators of motion and of absence of motion constituting the reference pattern.

12. The receiver of audiovisual transmissions as claimed in claim 8, wherein it furthermore comprises a means of transmitting a so-called "lock-on" signal when the value of the confidence counter reaches a determined value, the lock-on signal triggering the storage of the audiovisual transmission in the appliance.

13. The receiver of audiovisual transmissions as claimed in claim 8, wherein it comprises a divider of the value of the confidence counter, said divider being activated when the comparator detects a difference between the reference pattern and the frame repetition pattern detected by the determining means.

14. The receiver of audiovisual transmissions as claimed in claim 8, wherein the motion detector detects a motion between two frames of like parity which are separated by at least one frame of the same parity as the first two.

* * * * *